US010398970B2

(12) United States Patent
Gault et al.

(10) Patent No.: US 10,398,970 B2
(45) Date of Patent: *Sep. 3, 2019

(54) METHODS AND SYSTEMS FOR DIFFERENTIATION OF VIDEO FRAMES FOR ACHIEVING BUFFERED DECODING AND BUFFERLESS DECODING

(71) Applicant: Sony Interactive Entertainment America LLC, San Mateo, CA (US)

(72) Inventors: Andrew Buchanan Gault, San Francisco, CA (US); Rui Filipe Andrade Pereira, Aliso Viejo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/869,513

(22) Filed: Sep. 29, 2015

(65) Prior Publication Data
US 2016/0021381 A1    Jan. 21, 2016

Related U.S. Application Data

(63) Continuation of application No. 12/790,948, filed on May 31, 2010, now Pat. No. 9,723,319.
(Continued)

(51) Int. Cl.
*A63F 13/355* (2014.01)
*H04L 29/06* (2006.01)
(Continued)

(52) U.S. Cl.
CPC ............ *A63F 13/355* (2014.09); *A63F 13/00* (2013.01); *A63F 13/10* (2013.01); *A63F 13/12* (2013.01);
(Continued)

(58) Field of Classification Search
CPC ........ A63F 13/355; A63F 13/35; A63F 13/42; A63F 13/537; A63F 13/71; A63F 13/77; A63F 13/795; A63F 13/86; A63F 13/87; A63F 13/00; A63F 13/10; A63F 13/12; A63F 2300/407; A63F 2300/409; A63F 2300/51; A63F 2300/538; A63F 2300/552; H04N 19/44; G06F 2009/45579; G06F 2009/45595; G06F 9/45537; G06F 9/45558; H04L 67/10; H04L 29/06027; H04L 65/4069; H04L 65/607; H04L 65/80; H04L 67/18; H04L 67/38
See application file for complete search history.

(56) References Cited

U.S. PATENT DOCUMENTS 6,939,233 B2 * 9/2005 Emmerson ............... A63F 13/12
463/41
2004/0125816 A1 * 7/2004 Xu ................... H04N 21/23406
370/411
(Continued)

*Primary Examiner* — Maria E Vazquez Colon
(74) *Attorney, Agent, or Firm* — Penilla IP, APC

(57) ABSTRACT

Systems and methods of managing H.264 compliant video that lacks B Frames include decoding without the use of a significant video frame buffer. This variant of the H.264 standard may include a flag indicating that the video does not include B Frames. The video may be used in applications, such as computer games, in which processing of B Frames introduces undesirable lag.

20 Claims, 3 Drawing Sheets

Related U.S. Application Data

(60) Provisional application No. 61/345,534, filed on May 17, 2010, provisional application No. 61/323,354, filed on Apr. 12, 2010, provisional application No. 61/183,546, filed on Jun. 2, 2009, provisional application No. 61/183,088, filed on Jun. 2, 2009, provisional application No. 61/183,037, filed on Jun. 1, 2009, provisional application No. 61/183,035, filed on Jun. 1, 2009.

(51) Int. Cl.

| | |
|---|---|
| A63F 13/77 | (2014.01) |
| A63F 13/42 | (2014.01) |
| A63F 13/40 | (2014.01) |
| A63F 13/30 | (2014.01) |
| G06F 9/455 | (2018.01) |
| A63F 13/00 | (2014.01) |
| A63F 13/35 | (2014.01) |
| A63F 13/537 | (2014.01) |
| A63F 13/795 | (2014.01) |
| H04N 19/44 | (2014.01) |
| H04L 29/08 | (2006.01) |
| A63F 13/335 | (2014.01) |
| A63F 13/86 | (2014.01) |
| A63F 13/87 | (2014.01) |
| A63F 13/71 | (2014.01) |
| H04N 19/136 | (2014.01) |
| H04N 19/42 | (2014.01) |
| H04N 19/46 | (2014.01) |
| H04N 19/70 | (2014.01) |

(52) U.S. Cl.
CPC ............ *A63F 13/335* (2014.09); *A63F 13/35* (2014.09); *A63F 13/42* (2014.09); *A63F 13/537* (2014.09); *A63F 13/71* (2014.09); *A63F 13/77* (2014.09); *A63F 13/795* (2014.09); *A63F 13/86* (2014.09); *A63F 13/87* (2014.09); *G06F 9/45537* (2013.01); *G06F 9/45558* (2013.01); *H04L 29/06027* (2013.01); *H04L 65/4069* (2013.01); *H04L 65/607* (2013.01); *H04L 65/80* (2013.01); *H04L 67/18* (2013.01); *H04L 67/38* (2013.01); *H04N 19/136* (2014.11); *H04N 19/42* (2014.11); *H04N 19/44* (2014.11); *H04N 19/46* (2014.11); *H04N 19/70* (2014.11); *A63F 2300/407* (2013.01); *A63F 2300/409* (2013.01); *A63F 2300/51* (2013.01); *A63F 2300/538* (2013.01); *A63F 2300/552* (2013.01); *G06F 2009/45579* (2013.01); *G06F 2009/45595* (2013.01); *H04L 67/10* (2013.01)

(56) References Cited

U.S. PATENT DOCUMENTS

| | | | | |
|---|---|---|---|---|
| 2009/0010331 | A1* | 1/2009 | Jeon | H04N 19/105 375/240.12 |
| 2009/0244305 | A1* | 10/2009 | Yoshida | G11B 27/034 348/220.1 |
| 2010/0008419 | A1* | 1/2010 | Wu | H04N 19/105 375/240.15 |

* cited by examiner

METHODS AND SYSTEMS FOR DIFFERENTIATION OF VIDEO FRAMES FOR ACHIEVING BUFFERED DECODING AND BUFFERLESS DECODING

CLAIM OF PRIORITY

This application is a continuation of and claims the benefit of and priority, under 35U.S.C. § 120, to co-pending U.S. patent application Ser. No. 12/790,948, filed on May 31, 2010, and entitled "Differentiation For Achieving Buffered Decoding and Bufferless Decoding", which claims the benefit of and priority, under 35 U.S.C. § 119(e), to a Provisional Patent Application No. 61/183,035 filed Jun. 1, 2009 and entitled "Game Server Architecture", both of which are incorporated by reference herein in their entirety.

The U.S. patent application Ser. No. 12/790,948 claims the benefit of and priority, under 35 U.S.C. § 119(e), to a Provisional Patent Application No. 61/183,037 filed Jun. 1, 2009 and entitled "Bufferless H.264 Variant", which is incorporated by reference herein in its entirety.

The U.S. patent application Ser. No. 12/790,948 claims the benefit of and priority, under 35 U.S.C. § 119(e), to a Provisional Patent Application No. 61/183,088 filed Jun. 2, 2009 and entitled "I/O Level Virtualization", which is incorporated by reference herein in its entirety.

The U.S. patent application Ser. No. 12/790,948 claims the benefit of and priority, under 35 U.S.C. § 119(e), to a Provisional Patent Application No. 61/183,546 filed Jun. 2, 2009 and entitled "Self-Spawning Game Environments", which is incorporated by reference herein in its entirety.

The U.S. patent application Ser. No. 12/790,948 claims the benefit of and priority, under 35 U.S.C. § 119(e), to a Provisional Patent Application No. 61/323,354 filed Apr. 12, 2010 and entitled "Artificial Frames", which is incorporated by reference herein in its entirety.

The U.S. patent application Ser. No. 12/790,948 claims the benefit of and priority, under 35 U.S.C. § 119(e), to a Provisional Patent Application No. 61/345,534 filed May 17, 2010 and entitled "Dynamic Game Server Including Qualifier", which is incorporated by reference herein in its entirety.

FIELD OF THE INVENTION

The invention is in the field of video.

BACKGROUND

H.264 is a video standard that can be decoded by software such as Adobe Flash®. The H.264 standard, at least the Extended Profile or better, includes several different types of video frames including Key Frames, P Frames and B Frames. Key Frames generally include a greater amount of information than P Frames and B Frames. Key Frames may include enough video information to create a complete video image. When a standard H.264 decoder receives a P Frame, the decoder will use a previous Key Frame and optionally one or more previous P frames to create a complete video image. B Frames include information for future use by the decoder. For example, the information within a B Frame may not be used until 6 or 10 frames later. The B Frame is a tool for providing advance information to the decoder. Because the B Frame must be stored before use, the H.264 decoding standard requires that eight frames be buffered at the decoder.

SUMMARY

The invention includes systems and methods of communicating H.264 variant video without buffering eight frames on the decoder end. The invention further includes systems and methods for generating the H.264 variant video and for decoding the H.264 variant video. The H.264 variant video is optionally used in computer gaming or other interactive environments.

Various embodiments of the invention include a video system comprising video decoding logic configured to generate a video output configured for display on a computing device, the video processing logic comprising H.264 image generation logic configured to generate the video output using standard H.264 video, variant H.264 image generation logic configured to generate the video output using variant H.264 video without buffering at least eight frames of the variant H.264 video, type identification logic configured to differentiate between standard H.264 video and variant H.264 video and to direct received video to one of the H.264 image generation logic and the variant H.264 image generation logic based on the differentiation; memory configured to store the video processing logic; and a microprocessor configured to read the video processing logic from the memory and to execute the video processing logic.

Various embodiments of the invention include a computer readable medium having stored thereon computing instructions, the computing instructions comprising logic configured to receive encoded video; H.264 image generation logic configured to generate decoded video output using standard H.264 video, the video output being configured for display on a computing device; variant H.264 image generation logic configured to generate decoded video output using variant H.264 video without buffering at least eight frames of the variant H.264 video, the video output being configured for display on a computing device; and type identification logic configured to differentiate between standard H.264 video and variant H.264 video and to direct the received video to one of the H.264 image generation logic and the variant H.264 image generation logic based on the differentiation.

Various embodiments of the invention include a video transmission system comprising a video source configured to serve video data; an encoder configured to encode the video data according to the H.264 standard without including B Frames in the encoded video; an output configured to communicate the encoded video over a communication network; an input configured to receive the encoded video over the communication network; a decoder configured to decode the received video without buffering frames; and a display configured to display the decoded video.

Various embodiments of the invention include a method of encoding video, the method comprising receiving video data from a video source; encoding the received video compliant to the H.264 standard, the encoded video lacking B Frames; adding a flag to the encoded video, the flag including a value indicating that the encoded video lacks B frames; and sending the encoded video to a client over a communication network.

Various embodiments of the invention include a method of decoding video, the method comprising receiving encoded video; examining a frame of the encoded video to find a flag; based on the flag determining that the video is H.264 compliant and does not include B Frames; and decoding the video.

Various embodiments of the invention include a video encoder comprising encoding logic configured to receive video data and to encode the video data to a stream of video frames that do not include B Frames, the encoder optionally configured to encode according to a H.264 codec, and configured to encode according to a codec that includes B Frames; and flag logic configured to insert a flag within the stream of video frames, the flag configured to indicate that the stream of video frames does not include any B Frames.

DETAILED DESCRIPTION

Figure 1:
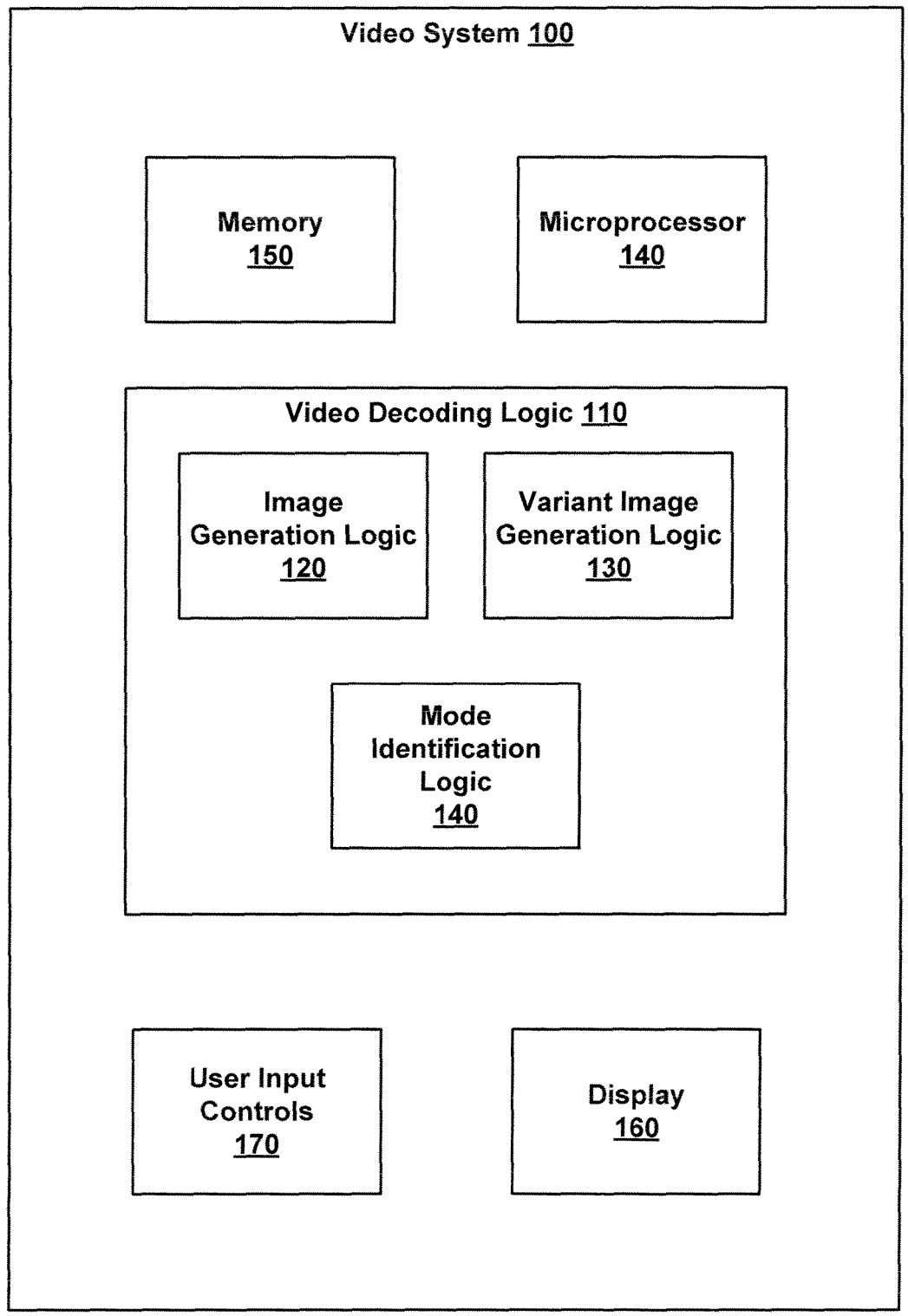
FIG. 1 illustrates a client side video system, according to various embodiments of the invention.

FIG. 1 illustrates a Video System 100, according to various embodiments of the invention. Video System 100 is configured to generate video suitable for display based on encoded video received from an external source. The encoded video can be either of two alternative types: Standard H.264 video or Variant H.264 video. In either case the encoded video discussed herein is limited to video encoded at the Extended Profile of H.264 or better, (e.g., at the Extended Profile, the Main Profile, the High Profile, the High 10 Profile, the High 4:2:2 Profile or the High 4:4:4 Predictive Profile). The Variant H.264 video has the characteristics of the profile except for the B Frames. Characteristics of these standard profiles are discussed in 61/183, 037 filed Jun. 1, 2009 and entitled "Bufferless H.264 Variant." Both of these types are compliant with the H.264 standard. H.264 is a standard for video compression, and is equivalent to MPEG-4 Part 10, or MPEG-4 AVC (for Advanced Video Coding). The final drafting work on the first version of the standard was completed in May 2003. As of May 2009, H.264 is the latest block-oriented motion-compensation-based codec standard developed by the ITU-T Video Coding Experts Group (VCEG) together with the ISO/IEC Moving Picture Experts Group (MPEG), and it was the product of a partnership effort known as the Joint Video Team (JVT). The ITU-T H.264 standard and the ISO/IEC MPEG-4 Part 10 standard (formally, ISO/IEC 14496-10) are jointly maintained so that they have identical technical content.

Variant H.264 video, as referred to herein, is video that meets the H.264 standard and does not include B Frames and optionally includes a flag indicating that there are no B Frames in the video. Standard H.264 video, as referred to herein, is video that meets the H.264 standard and may include B Frames. Standard H.264 and variant H.264 video must be decoded for display on a computing device.

Video System 100 includes Video Decoding Logic 110. Video Decoding Logic 110 includes hardware, firmware and/or software stored on a computer readable medium. For example, in some embodiments Video Decoding Logic 100 includes computing instructions stored in a Memory 150. Memory 150 may include static or volatile memory, RAM, Flash Memory, SRAM, a hard drive, an optical storage media, or any other computing memory.

Video Decoding Logic 110 comprises Type Identification Logic 140, Image Generation Logic 120, and Variant Image Generation Logic 130. Type Identification Logic 140 is configured to differentiate between standard H.264 video and variant H.264 video. This differentiation typically includes examination of video frames for (single or multi-bit) flags configured to specify a particular video type. For example, a first flag value may be configured to indicate that the video is standard H.264 video and a second flag value may be configured to indication that the video is variant H.264 video. The flag is optionally disposed in a codec index and/or in the first four bits of a frame of the received video. Video Decoding Logic 110 is optionally configured to execute within a browser and/or as a browser add-on. Video Decoding Logic 110 is optionally configured to decode Flash video.

Type Identification Logic 140 is further configured to alternatively direct received video to one of the (H.264) Image Generation Logic 120 and the Variant (H.264) Image Generation Logic 130 based on the differentiation between the video types. For example, if the differentiation determines that the received video is of the standard type, then Type Identification Logic 140 will direct the received video to Image Generation Logic 120. Likewise, if the differentiation determines that the received video is of the variant type, then Type Identification Logic 140 will direct the received video to Variant Image Generation Logic 130. Type Identification Logic 140 is optionally configured to differentiate between, and direct video base on, more than two video types compliant with the H.264 standard. The determination and direction performed by Type Identification Logic 140 is optionally performed on a frame-by-frame basis.

In some embodiments, Type Identification Logic 140 is configured to assume that received video is variant H.264 and, thus, initially direct the video to Variant Image Generation Logic 130 where minimum or no buffering occurs. In these embodiments, if the assumption is found to be incorrect and a B Frame is received, the amount of buffering that is performed is increased such that B Frames are properly utilized. For example, video frames are initially sent to Variant Image Generation Logic 130, once (if) a B Frame is received, the remainder of the video frames within this video stream are then sent to Image Generation Logic 120. This may be accomplished by merely changing the size of the buffer, e.g., from zero to eight frames.

Image Generation Logic 120 is configured to decode the received standard H.264 compatible video to generate video images configured for display on a Display 160. Image Generation Logic 120 is typically configured to buffer eight or more video frames of the received video during the decoding process. The decoded output of Image Generation Logic 120 includes an image configured for display on Display 160. Image Generation Logic 120 is optionally fully compatible with the H.264 standard.

Variant Image Generation Logic 130 is configured to generate the video output using variant H.264 video without buffering at least eight frames of the variant H.264 video. In various embodiments, Variant Image Generation Logic 120 is configured to buffer zero, one, two, four or six frames during decoding. The decoded video output of Variant Image Generation Logic 130 includes an image configured for display on Display 160. In various embodiments, Variant Image Generation Logic 130 is configured to generate the video output within 25, 50, 100, 150, 175, 190 or 195 milliseconds of receiving the encoded variant H.264 video.

Variant Image Generation Logic 130 is not fully compliant with the H.264 standard because it does not handle B Frames.

Image Generation Logic 120 and Variant Image Generation Logic 130 optionally share computing instructions. In some embodiments, the primary difference between Image Generation Logic 120 and Variant Image Generation Logic 130 is that Variant Image Generation Logic 130 includes a smaller, or no, video receive buffer. For example, in some embodiments Image Generation Logic 120 and Variant Image Generation Logic 130 share the same computing instructions but Image Generation Logic 120 additionally includes a receive buffer.

Optional User Input Controls 170 are configured for a user to input control commands These commands may be configured to control the presentation or content of the received video. For example, in some embodiments User Input Controls 170 are configured to control a video game that generates the received video. In some embodiments, User Input Controls 170 are used to select among video sources and/or to determine the resolution at which video should be displayed on Display 160. User Input Controls 170 may include a keyboard, joystick, touch screen, mouse, trackball, touch pad, position or motion sensitive control, or any other standard input device.

Optional Display 160 is a video display of a computing device. Display 160 may be part of a computer monitor, a television, a game device, a telephone, a game console, or the like. Display 160 may be configured to display video at one or more of the numerous standard video resolutions.

Figure 2:
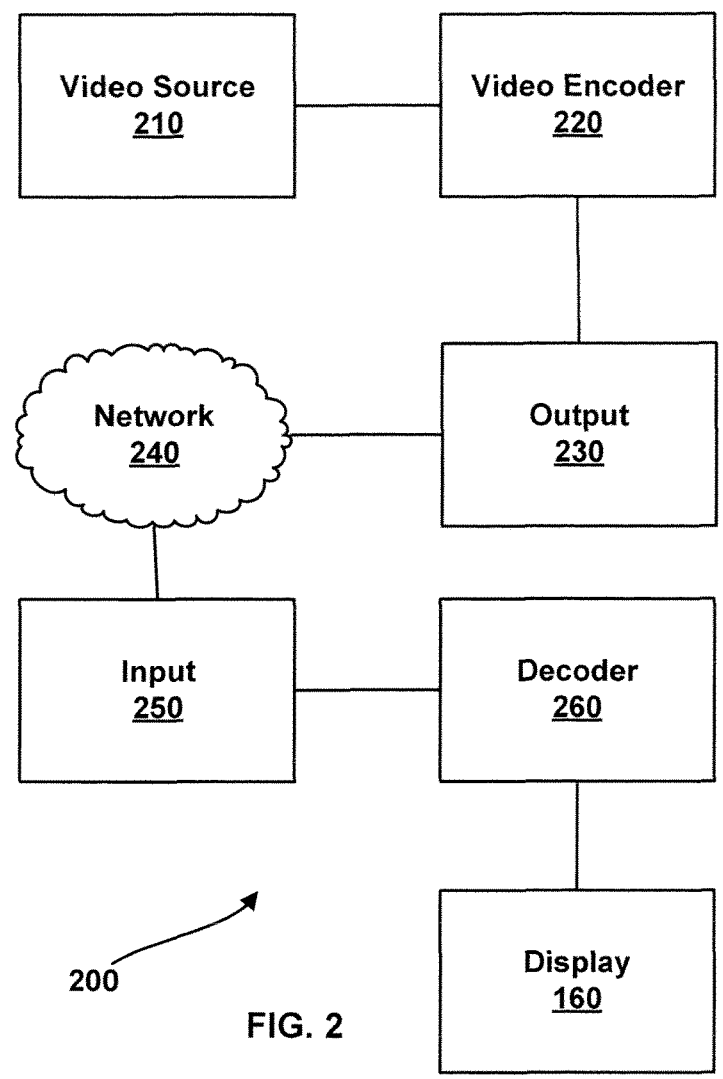
FIG. 2 illustrates a video transmission system, according to various embodiments of the invention.

FIG. 2 illustrates a Video Transmission System 200, according to various embodiments of the invention. Video Transmission System 200 is configured to generate video, encode the generated video to a H.264 compliant encoded form, transmit the encoded video over a computing network, receive the encoded video at a client, decode the encoded video and display the decoded video. The H.264 compliant encoded video does not include B Frames.

More specifically, Video Transmission System 200 includes a server side Video Source 210 configured to serve stored video and/or serve video generated in real-time. Video Source 210 may include a video camera, a video game server, a real-time simulator, an interactive video system, computer readable media configured to store video data, a game engine, a graphics processing unit (GPU), and/or the like. The video generated or served by Video Source 210 may include encoded or raw video. Video Source 210 is optionally configured to serve more than one video stream. For example, Video Server 210 may be configured to execute one or more computer game and to deliver game video to one or more targets, e.g., clients. Video Server 210 is optionally configured to generate and serve real-time video of real-time events using a camera.

Video Server 210 is optionally configured to provide a video stream using more than one codec in series, and to switch between the more than one codec during transmission of the video stream. For example Video Server 210 may be configured to serve a video stream using a first codec such as H.264 and then change the video steam to a different codec mid stream. This change may be reversed without significantly interrupting the video stream.

Video Transmission System 200 further includes a Video Encoder 220 configured to encode the video data to an encoded form compliant with the H.264 standard without including B Frames in the encoded video, e.g., to generate variant H.264 video. Such encoding typically results in a lower bit transmission capacity relative to an encoding wherein B Frames are included. An approach to encoding H.264 without B Frames is to set the encoding options— bframes <integer> or –bf <integer> (in x264 or FFmpeg respectively) to zero. This implicitly turns off a variety of other B Frame options. Video Encoder 220 may include hardware, firmware and/or software stored on a computer readable medium. In some embodiments, Video Encoder 220 includes a computing device having several input channels configured to receive video from a plurality of Video Source 210. More than one instance of Video Encoder 220 may received video from the same Video Source 210. Video Encoder 220 is optionally included within Video Source 210.

Video Encoder 220 is optionally configured to add a flag to the encoded video. For example Video Encoder 220 may add a flag configured to differentiate between H.264 compliant video that includes B Frames and variant H.264 compliant video that does not include B Frames. This flag may include one or more bits and is optionally disposed in a codec index or within the first few bits of a video frame.

Video Transmission System 200 further includes an Output 230 configured to communication over a Network 240. Output 230 may be any network interface suitable for communicating video data. For example, a telephone interface, a TCP/IP interface, UDP (or alternative transport layers), an Ethernet interface, an internet connection, and/or the like. Video Source 210, Video Encoder 220 and/or Output 230 are considered the "server side" of Video Transmission System 200 and are optionally embodied in the same computing device.

On a client side, Video Transmission System 200 further includes an Input 250 configured to receive the variant H.264 video. Input 250 may include a wireless connection, an infrared connection, a telephone interface, a TCP/IP interface, UDP (or alternative transport layers), an Ethernet interface, a cable TV connection, a satellite receiver, an internet connection, and/or the like.

Video Transmission System 200 further includes a Decoder 260 typically configured to decode the H.264 compliant and B Frame free video signal, e.g., decode variant H.264 video. Decoder 260 optionally includes an embodiment of Video System 100 or parts thereof. For example, Decoder 260 may include Memory 150, Microprocessor 140 and Video Decoding Logic 110. Decoder 260 is optionally configured to alternatively decode the video received at Input 250 with and without buffering frames. Decoder 260 and Video Decoding Logic 110 are optionally configured to decode Adobe Flash®. Decoding without B Frames requires less time because the B Frames do not have to be buffered. This reduces lag relative to decoding with B Frames.

Input 250, Decoder 260 and Display 160 are optionally, at least in part, included in a computing device such as a television, a television console, a table computer, a game console, a game device, a personal computer, a tablet computer, a telephone, an interactive display device, a satellite receiver, a cable box, a wireless telephone, a game controller, a remote control, and/or the like. Video Source 210 is optionally configured to receive commands, e.g., game commands, from this computing device and configured to generate the video responsive to these commands. Input 250, Decoder 260 and Display 160 are considered the "client side" of Video Transmission System 200. The server and client sides of Video Transmission System 200 may each be found alone in various embodiments.

Figure 3:
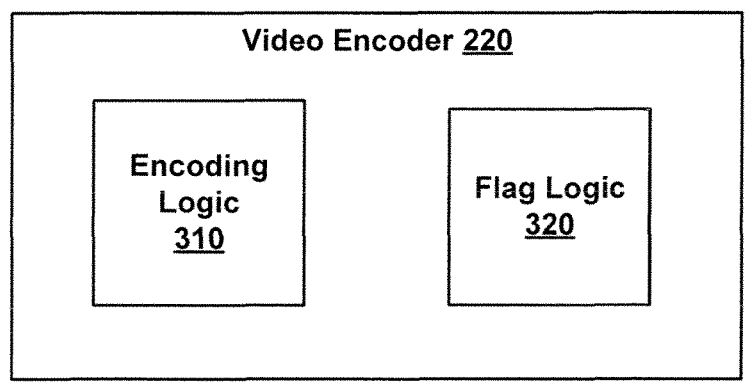
FIG. 3 illustrates a video encoder, according to various embodiments of the invention.

FIG. 3 illustrates further details of Video Encoder 220, according to various embodiments of the invention. Video Encoder 220 includes Encoding Logic 310 and optional Flag Logic 320. Video Encoder 220 is configured to receive video data from Video Source 210 and to encode the received video data according to a codec, such as H.264, that normally includes B Frames. However, Encoding Logic 310 is configured to not include B Frames in the resulting stream of encoded video frames. Not including B Frames can result in a need to communicate a greater number of bits than would be required if B Frames were used.

Flag Logic 320 is configured to insert a flag within the stream of video frames. This flag configured to indicate that the stream of video frames does not include any B Frames. The flag may include or be included in a codec index or in the first few (1, 2, 3, 4 or 8) bits, of each frame. The insertion of the flag may occur during the encoding process.

Figure 4:
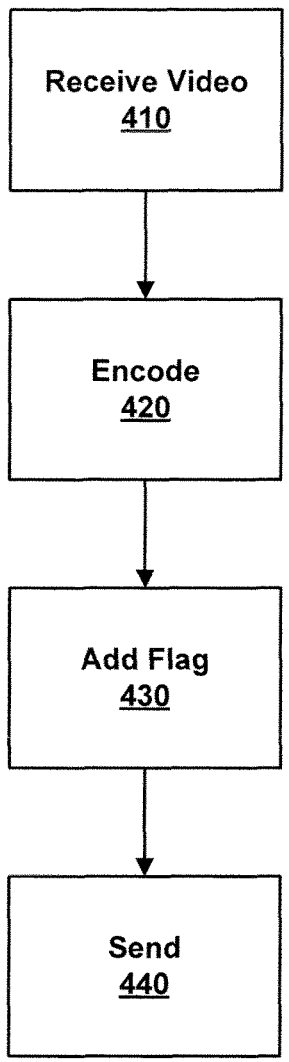
FIG. 4 illustrates a method of encoding video, according to various embodiments of the invention.

FIG. 4 illustrates a method of encoding video, according to various embodiments of the invention. This method may be performed using, for example, the server side of Video Transmission System 200.

In a Receive Video Step 410 video is received by Video Encoder 220 from Video Source 210. The received video may be raw video and/or video already encoded. The video may be received over the internet, over a local network, or from a source more directly connected to Video Encoder 220, such as a GPU.

In an Encode Step 420 the received video is encoded compliant to the variant H.264, e.g., the received video is encoded to the H.264 standard and also encoded such that the video lacks B Frames. This encoding may be from raw video, from some other encoding or from a standard H.264 compliant encoding that included B Frames. Encode Step 420 is typically performed using Encoding Logic 310.

In an optional Add Flag Step 430, Video Encoder 220 adds a flag to the encoded video using Flag Logic 320. This flag includes a value indicating that the encoded video lacks B frames. Add Flag Step 430 is optionally performed in parallel with Encode Step 420. For example, a flag may be added as each frame is encoded. The flag may include or be included in a codec index or in the first few (1, 2, 3, 4 or 8) bits, of each frame.

In a Send Step 440 the encoded video is sent to a client over a communication network. For example, the variant H.264 video including the flag may be sent to the client side of Video Transmission System 200 via Network 240. The video is optionally sent as it is encoded, as a video stream.

Figure 5:
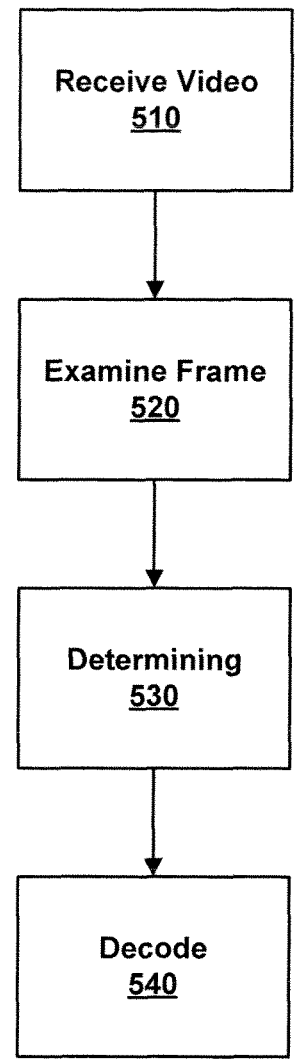
FIG. 5 illustrates a method of decoding video, according to various embodiments of the invention.

FIG. 5 illustrates a method of decoding video, according to various embodiments of the invention. This method may be performed using, for example, the client side of Video Transmission System 200. This method is typically performed following the method illustrated in FIG. 4, although optionally by a different party.

In a Receive Video Step 510, the variant H.264 encoded video is received by the client side of Video Transmission System 200.

In an Examine Frame Step 520 a frame of the received encoded video is examined to find a flag identifying the encoding as being without B Frames. For example, being variant H.264 encoding rather than standard H.264 encoding. Alternatively, in embodiments where the video is first assumed to be without B Frames, Examine Frame Step 520 includes monitoring to see if a B Frame has been received, and does not necessarily include finding a flag.

In a Determining Step 530 the flag found in Examine Frame Step 520 is used to determine that the received video is H.264 compliant and does not include B Frames, e.g., is variant H.264. This determination may be performed by comparing a value of the found flag with values expected for different codecs. Determine Step 530 is optionally performed by Decoder 260. Alternatively, in those embodiments wherein it is assumed that the video is without B Frames, Determining Step 530 includes finding that a B Frame has been received and based on that finding determining that the received video includes B Frames and, thus, must be buffered as it is decoded to properly process the B Frames.

In a Decode Step 540 the received video is decoded without buffering at least eight video frames, if the video has been determined (or assumed) to be without B Frames. In various embodiments, the decoding is performed within 25, 50, 100, 150, 175, 190 or 195 milliseconds of receiving the encoded variant H.264 video at a client. In various embodiments the decoding is performed while buffering zero, one, two, four or six frames during decoding. Decode Step 540 is optionally performed by Decoder 260. The decoded video is optionally displayed using Display 160. If the video has been determined to include B Frames, then a greater amount of buffering is used so that the B Frames can be properly processed.

The methods illustrated in FIGS. 3 and 4 are optionally performed by different parties in cooperation. Further, these methods may be performed by computing systems other than those illustrated in FIGS. 1 and 2.

Several embodiments are specifically illustrated and/or described herein. However, it will be appreciated that modifications and variations are covered by the above teachings and within the scope of the appended claims without departing from the spirit and intended scope thereof. For example while the H.264 standard is discussed herein by way of example, the systems and methods discussed herein are applicable to other video codecs that normally include frame buffering to decode. The systems and methods discussed herein can be applied to other members of the "family of standards" of which H.264 is a member. Examples of this family are described in U.S. Provisional Patent Application Ser. No. 61/183,037 filed Jun. 1, 2009 and entitled "Bufferless H.264 Variant." The systems and methods described herein may be applied to audio as well as video data. Some embodiments of the invention include the use of PIR (Periodic Intra Refresh) to make the sizes of transmitted video frames more consistent, and reduce the maximum size. PR includes placing I frame data in P frames. As a result, I frames are not transmitted as often.

Computing devices referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information. The various examples of logic noted herein can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated and/or transformed by a special purpose computing system while performing those particular functions is at least electronically saved in buffers of the computing system, physically changing the special purpose computing system from one state to the next with each change to the stored data.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A client device comprising:
    a type identification circuit configured to receive a video stream via a computer network, wherein the type identification circuit is configured to identify a B frame to further identify a plurality of standard video frames from the video stream, wherein the video stream includes a plurality of variant video frames that are non-compliant with an H.264 video compression format and the standard video frames are compliant with the H.264 video compression format;
    a variant video decoder circuit interfaced with the type identification circuit, wherein the variant video decoder is configured to decode the variant video frames identified by the type identification circuit, wherein the variant video decoder circuit excludes a video receive buffer for storing the variant video frames that are received within the video stream; and
    a standard video decoder circuit interfaced with the type identification circuit and configured to decode the standard video frames.

2. The client device of claim 1, wherein the variant video frames comply with a standard that is a variant of the H.264 video compression format, wherein the variant H.264 standard excludes encoding and decoding of B-frames, wherein the H.264 video compression format includes encoding and decoding of the B frame.

3. The client device of claim 1, wherein the video receive buffer is configured to store the B frame that is received within the video stream, wherein the B frame is a portion of the standard video frames, wherein the standard video decoder circuit includes the video receive buffer for storing the B frame.

4. The client device of claim 1, wherein the type identification circuit is configured to monitor the video stream to determine whether a flag is included within the video stream, wherein the type identification circuit is configured to identify that the video stream includes the standard video frames based on the flag.

5. The client device of claim 4, wherein the flag is included within a codec index of each of the variant video frames.

6. The client device of claim 1, wherein the type identification circuit is configured to:
    determine whether a flag is found in a portion of the video stream;
    compare a value of the flag with a pre-stored value to identify whether the H.264 video compression format or a standard non-compliant with the H.264 video compression format is to be used to decode the portion the video stream;
    determine that the H.264 video compression format be used to decode the portion of the video stream upon determining based on the comparison that the value of the flag is a first value; and
    determine that the standard non-compliant with the H.264 video compression format be used to decode the portion of the video stream upon determining based on the comparison that the value of the flag is a second value.

7. The client device of claim 1, wherein the type identification circuit is configured to monitor the video stream to determine whether a flag is included within the standard video frames or the variant video frames, wherein the type identification circuit is configured to identify that the video stream includes the standard video frames upon determining that the flag is excluded from the standard video frames.

8. The client device of claim 1, wherein the type identification circuit is configured to monitor the video stream to determine whether a flag is included within the standard video frames or the variant video frames, wherein the type identification circuit is configured to identify that the video stream includes the variant video frames upon determining that the flag is included within the standard video frames.

9. The client device of claim 1, wherein the variant video frames exclude B frames, wherein the standard video frames includes the B frame.

10. The client device of claim 1, wherein the variant video frames include less than a pre-determined number of B frames, wherein the standard video frames include at least the pre-determined number of B frames.

11. The client device of claim 1, further comprising a display device configured to display a video from the decoded variant video frames and the decoded standard video frames.

12. A game device comprising:
    a user input controller configured to receive control commands regarding a game from a user; and
    a video decoder including:
        a type identification circuit configured to receive a video stream of the game via a computer network, wherein the type identification circuit is configured to identify a B frame to further identify a plurality of standard video frames from the video stream, wherein the video stream includes a plurality of variant video frames that are non-compliant with an H.264 video compression format, wherein the standard video frames are compliant with the H.264 video compression format,
        a variant video decoder circuit interfaced with the type identification circuit, wherein the variant video decoder is configured to decode the variant video frames identified by the type identification circuit, wherein the variant video decoder circuit excludes a video receive buffer for storing the variant video frames that are received within the video stream;
        a standard video decoder circuit interfaced with the type identification circuit and configured to decode the standard video frames identified by the type identification circuit; and
    a display device coupled to the video decoder, wherein the display device is configured to display a video of the game generated using the variant video frames.

13. The game device of claim 12, wherein the variant video frames comply with a standard that is a variant of the H.264 video compression format, wherein the variant H.264 standard excludes encoding and decoding of B frames, wherein the H.264 video compression format includes encoding and decoding of the B frame.

14. The game device of claim 12, wherein the video receive buffer is configured to store the B frame that is received within the video stream, wherein the B frame is a portion of the standard video frames, wherein the standard video decoder circuit includes the video receive buffer for storing the B frame.

15. The game device of claim 12, wherein the type identification circuit is configured to:
  determine whether a flag is found in a portion of the video stream;
  compare a value of the flag with a pre-stored value to identify whether the H.264 video compression format or a standard non-compliant with the H.264 video compression format is to be used to decode the portion the video stream;
  determine that the H.264 video compression format be used to decode the portion of the video stream upon determining based on the comparison that the value of the flag is a first value; and
  determine that the standard non-compliant with the H.264 video compression format be used to decode the portion of the video stream upon determining based on the comparison that the value of the flag is a second value.

16. A method comprising:
  receiving a video stream via a computer network;
  identifying a B frame to further identify a plurality of standard video frames in the video stream, wherein the video stream includes a plurality of variant video frames that are non-compliant with an H.264 video compression format, wherein the standard video frames are compliant with the H.264 video compression format;
  decoding, by a variant decoder circuit, the variant video frames that are identified, wherein the variant video decoder circuit excludes a video receive buffer for storing the variant video frames that are received within the video stream; and
  decoding the standard video frames that are identified.

17. The method of claim 16, further comprising monitoring the video stream to determine whether a flag is included within the standard video frames or the variant video frames, wherein identifying is performed based on the flag.

18. The method of claim 16, wherein the variant video frames comply with a standard that is a variant of the H.264 video compression format, wherein the variant H.264 standard excludes encoding and decoding of B frames, wherein the H.264 video compression format includes encoding and decoding of the B frame.

19. The method of claim 16, wherein the video receive buffer is configured to store the B frame that is received within the video stream, wherein decoding of the standard video frames is performed by buffering the B frame.

20. The method of claim 16, further comprising:
  determining whether a flag is found in a portion of the video stream;
  comparing a value of the flag with a pre-stored value to identify whether the H.264 video compression format or a standard non-compliant with the H.264 video compression format is to be used to decode the portion the video stream;
  determining that the H.264 video compression format is to be used to decode the portion of the video stream upon determining based on the comparison that the value of the flag is a first value; and
  determining that the standard non-compliant with the H.264 video compression format is to be used to decode the portion of the video stream upon determining based on the comparison that the value of the flag is a second value.

* * * * *